US006597551B2

(12) United States Patent
Heaney

(10) Patent No.: US 6,597,551 B2
(45) Date of Patent: Jul. 22, 2003

(54) POLYMER CURRENT LIMITING DEVICE AND METHOD OF MANUFACTURE

(75) Inventor: Michael B. Heaney, Palo Alto, CA (US)

(73) Assignee: Huladyne Corporation, Palo Alto, CA (US)

( * ) Notice: Subject to any disclaimer, the term of this patent is extended or adjusted under 35 U.S.C. 154(b) by 35 days.

(21) Appl. No.: 10/017,878

(22) Filed: Dec. 12, 2001

(65) Prior Publication Data

US 2002/0070842 A1 Jun. 13, 2002

Related U.S. Application Data

(60) Provisional application No. 60/255,547, filed on Dec. 13, 2000.

(51) Int. Cl.[7] .................................................. H02H 9/00
(52) U.S. Cl. ........................................ 361/58; 338/22 R
(58) Field of Search ................ 361/58, 124; 338/22 R, 338/20, 23, 22 SD

(56) References Cited

U.S. PATENT DOCUMENTS 2,258,958 A 10/1941 Pearson
2,978,665 A 4/1961 Vernet et al.
3,241,026 A 3/1966 Andrich
3,861,029 A 1/1975 Smith-Johannsen et al.
4,163,742 A 8/1979 Mansure
4,237,441 A 12/1980 van Konynenburg et al.
4,238,812 A 12/1980 Middleman et al.
4,255,698 A 3/1981 Simon
4,315,237 A 2/1982 Middleman et al.
4,318,881 A 3/1982 Sopory
4,329,726 A 5/1982 Middleman et al.
4,426,633 A 1/1984 Taylor
4,459,473 A 7/1984 Kamath
4,534,889 A 8/1985 van Konynenburg et al.
4,545,926 A 10/1985 Fouts, Jr. et al.
4,560,498 A 12/1985 Horsma et al.
4,624,990 A 11/1986 Lunk et al.
4,665,963 A 5/1987 Timar et al.
4,859,836 A 8/1989 Lunk et al.
4,902,444 A 2/1990 Kolouch
5,000,875 A 3/1991 Kolouch
5,045,673 A 9/1991 Kelly
5,093,898 A 3/1992 van Konynenburg et al.
5,171,774 A 12/1992 Ueno et al.
5,174,921 A 12/1992 Buchecker et al.
5,451,919 A 9/1995 Chu et al.
5,539,370 A 7/1996 Arnold
5,552,199 A 9/1996 Blong et al.
5,579,198 A 11/1996 Wieloch et al.
5,587,861 A 12/1996 Wieloch et al.
5,614,881 A * 3/1997 Duggal et al. ............ 338/22 R
5,645,746 A 7/1997 Walsh
5,667,711 A 9/1997 Mody et al.
5,737,160 A 4/1998 Duffy
5,747,147 A 5/1998 Wartenberg et al.
5,793,276 A 8/1998 Tosaka et al.
5,801,612 A 9/1998 Chandler et al.
5,837,164 A 11/1998 Zhao
5,847,630 A 12/1998 Arnold et al.
5,859,578 A 1/1999 Arnold
5,864,453 A 1/1999 Wieloch et al.
5,874,885 A 2/1999 Chandler et al.
5,877,467 A 3/1999 Arnold et al.
5,886,860 A 3/1999 Chen et al.
5,925,467 A 7/1999 Strumpler et al.
5,928,547 A 7/1999 Shea et al.
5,939,968 A 8/1999 Nguyen et al.
5,968,419 A 10/1999 Sadhir et al.
5,969,928 A 10/1999 Hashimoto et al.
5,985,182 A 11/1999 Zhao
5,990,778 A 11/1999 Strumpler et al.
6,028,753 A 2/2000 Wieloch et al.
6,038,117 A 3/2000 Dullni et al.
6,054,028 A 4/2000 Zingheim et al.
6,059,997 A 5/2000 Hall
6,130,597 A 10/2000 Toth et al.

OTHER PUBLICATIONS

Sung–Ik Lee et al., Effect of an oxide layer on the far–infrared absorption of small silver particles, Physical Review B, vol. 32, No. 6 (1985).
Tae Won Noh et al., Temperature–dependent far–infrared absorption of a metal–insulator composite, Physical Review B, vol. 33, No. 2 (1986).
Yi Song et al., Experimental study of the three–dimensional ac conductivity and dielectric constant of a conductor–insulator composite near the percolation threshold, Physical Review B, vol. 33, No. 2 (1986).
D.A. Rudman et al., Noise spectra of three–dimensional random metal–insulator composites, Physical Review B, vol. 33, No. 2 (1986).
Tae Won Noh et al., Temperature–dependent far–infrared absorption of silver smoke, Physical Review B, vol. 34, No. 4 (1986).
Sung–Ik Lee et al., Experimental observation of nonuniversal behavior of the conductivity exponent for three–dimensional continuum percolation systems, Physical Review B, vol. 34, No. 10 (1986).
Sung–Ik Lee et al., Far–Infrared Absorption of Silver–Particle Composites, Physical Review Letters, vol. 55, No. 15 (1986).
Liren Zhao et al., Self–resettable Polymer PTC Sensors for Automotive DC Motor Protection, SAE International, Sensors and Actuators (1999) (SP–1443).

* cited by examiner

*Primary Examiner*—Edward H. Tso
(74) *Attorney, Agent, or Firm*—Gray Cary Ware & Freidenrich LLP

(57) ABSTRACT

A polymer current limiting device is provided that has a wider operating temperature range and a lower thermal derating than conventional current limiting devices. The device may include pure lead (Pb) electrodes and a perfluoroalkoxy (PFA) polymer mixed with carbon black that achieve the wide temperature range and the low thermal derating.

36 Claims, 6 Drawing Sheets

POLYMER CURRENT LIMITING DEVICE AND METHOD OF MANUFACTURE

RELATED APPLICATION

This application claims priority under 35 USC §§119, 120 of U.S. patent application Ser. No. 60/255,547 filed on Dec. 13, 2000 and entitled "Polymer Current Limiting Device and Method of Manufacture".

BACKGROUND OF THE INVENTION

This invention relates generally to an electrical circuit element that conducts current with a low resistance during normal operation but, during a significant current increase, a significant ambient temperature increase, or some combination of current and ambient temperature increases, will transition to a high resistance state and limit the current flowing through the circuit. Once the current and/or ambient temperature overload condition passes, the element may return to its normal low resistance mode of operation so that a resettable fuse element is formed. In more detail, a polymer-based current limiting device and a method of manufacture is described.

An electrical circuit element that can be tripped and then be reset is well known. For example, there are many different current limiting devices wherein the device permits current to pass during normal circuit operation. The device is made of materials which exhibit a property that, during periods of increasing current, the materials melt due to the heat generated by the increased current and the resistance of the device increases so that the current is effectively limited. Once the over-current condition subsides, the materials in the device solidify again and the device returns to its original mode of operation.

There are many different conventional current limiting devices. For example, U.S. Pat. No. 2,258,958 to Pearson, assigned to Bell Labs, describes a conductive device wherein the conductance varies as a function of applied voltage or current, which may be used in the regulation and control of electric current. The device has conducting particles suspended in an insulating matrix where the coefficients of thermal expansion are very different. This appears to be an early patent on positive temperature coefficient (PTC) polymeric current limiters (PCL). Another patent recites a regulator device for electric current, which is PTC, resettable, trips rapidly, and trips with overcurrent and/or overtemperature. This patent recites carbon particles dispersed in a mixture of polyethylene (PE) and polytetrafluoroethylene (PTFE). Another patent recites using different materials to produce a heater cable wherein a carbon black/polymer composite heater cable obeys an arbitrary relation.

Raychem has several patents in the area of current limiting devices. For example, one patent recites low resistivity PTC compositions wherein a particular range of carbon black properties, composite resistivities, and temperatures are specified for conductive polymer composites, especially for circuit protection devices. The patent lists fluoropolymers as one possible polymer component. Another Raychem patent recites a method for annealing PTC compositions wherein conductive polymer composites containing two polymers have improved electrical properties are produced when the composite is annealed at a temperature between the melting points of the two polymers. Another Raychem patent recites a self-regulating heater cable made by winding a conductive polymer composite strand around two parallel wires, candy-cane fashion. Other Raychem patents recite different methods for manufacturing current limiting devices. Other Raychem patents cite high temperature current limiting devices wherein a mixture of PTFE and a fluoropolymer is used. Other companies have similar patents, which recite and describe other configurations of current limiting devices. Another Raychem patent to Lunk et al. describes devices made from perfluoroalkoxy (PFA) polymer, shows resistance versus temperature data, and discusses the potential use as current limiting devices in higher temperature environments.

In addition, Therm-O-Disc has received several patents for current limiting devices with a similar higher temperature range, based on nylon which has a melting point of up to 190° C. These patents actually teach away from using fluoropolymers to make polymer current limiting devices. Therm-O-Disc has also received a patent that, in part, describes the use of a high temperature solder for attaching electrical wires to a current limiting device that improves the properties of the device. The patent names various solders, but the best material (e.g., Sn95Ag5) has a high melting point of only 245° C.

Despite the large amount of conventional current limiting devices described in the literature and in various patents, the conventional current limiting devices do not achieve the advantages of the PCL device in accordance with the invention. In particular, none of the conventional current limiting devices is capable of operating at the wider temperature range and none of the conventional devices have the low thermal derating. Thus, it is desirable to provide a polymer current limiting device and it is to this end that the present invention is directed.

SUMMARY OF THE INVENTION

The polymer current limiting device (PCL) in accordance with the invention overcomes the problems and limitations with existing commercially available current limiting devices. In addition, the PCL in accordance with the invention has various advantages over the existing current limiting devices. The operating temperature range of the PCL device in accordance with the invention is significantly wider. The PCL devices have been experimentally shown to work as current limiters over the temperature range of −60° C. to 280° C. Most commercially available current limiting devices have a rated temperature range of −40° C. to 85° C. although some new devices have a rated temperature range of −40° C. to 125° C. A higher maximum operating temperature is important because it allows the PCL devices in accordance with the invention to be used in environments where the ambient temperature is very hot, perhaps too hot for existing commercially available PCL devices. For example, the PCL devices in accordance with the invention may be used near the engine or under the hood of a car, in electronics that may be near fire, in the door of a car parked in the sun in Arizona, outdoor use in hot climates, in electronics used in well drilling and geothermal applications, electronics used near steam and hot fluids, etc.

In addition, the preferred polymer used in the PCL devices in accordance with the invention (perfluoroalkoxy (PFA) polymer) is nonflammable and self-extinguishing in a fire. The polymer used in existing current limiting devices is flammable and will burn on its own after being ignited by a flame, a spark, or by self-heating during normal use in a circuit which experiences a large overcurrent. This makes the PCL devices in accordance with the invention much less of a fire hazard than existing current limiting devices. This also allows the PCL devices to be used in environments where there are sparks, such as a conventional circuit breaker, or flames, such as a water heater.

In addition, the PCL devices in accordance with the invention have a significantly better "thermal derating" than other commercially available current limiting devices wherein the thermal derating is the rate at which the device trip current decreases as the ambient temperature increases. As a quantitative example, most Raychem current limiting devices (those with an operating temperature range of −40° C. to 85° C.) have a thermal derating of −1%/°C., meaning that the trip current decreases by an average of 1% for every 1° C. increase in the ambient temperature. The PCL devices in accordance with the invention have an experimentally measured thermal derating of −0.4%/°C. over the same operating temperature range meaning that the trip current decreases by an average of 0.4% for every 1° C. increase in the ambient temperature. This is commercially useful because it makes the PCL devices more tolerant to changes in ambient temperature and fluctuations in the thermal environment.

In accordance with the invention, the PCL devices may preferably be made with pure lead (Pb) solder joints between the foil electrodes and the lead wires. Pure lead (Pb) solder joints have a nominal melting point of 327° C. Using the pure lead (Pb) joints, the PCL devices still function for brief temperature excursions up to 350° C. Most commercially available devices use solder that softens and fails at about 180° C. The use of pure lead (Pb) solder in accordance with the invention is commercially useful for several reasons. First, the UL 1434 specification tests for PCL devices requires that the devices be heated above the melting point of the polymer and the melting point of the PFA polymer used in the PCL devices in accordance with the invention is about 300° C. If a PCL device with attachment wires is to pass the UL specification test the joint between the device electrodes and the attachment wires must be able to withstand ambient temperatures above 300° C. The pure lead (Pb) solder used on the PCL devices is cheap, easy to apply, consistent with current PCL device manufacturing technology, and works fine for a reasonable temperature range above 300° C.

In accordance with the invention, the PCL devices do not need to have the polymer crosslinked to obtain stable electrical properties. In contrast, most commercially available PCL devices have to undergo a manufacturing step where the polymer is crosslinked. Radiation or chemical processes may be used to crosslink the conventional polymers. The crosslinking is claimed to give more stable and reliable devices. The PCL devices in accordance with the invention appear to be stable and reliable in all experiments in part because the polymer used in the devices is a fluoropolymer, which is composed mainly of carbon and fluorine atoms, compared to the non-fluoropolymers in conventional PCL devices, which are composed mainly of carbon and hydrogen atoms. Fluoropolymers are known to have significantly better chemical, oxidizer, and solvent resistance, better weatherability, and lower coefficient of water absorption than non-fluoropolymers. The fluoropolymer also has higher melt viscosity than the polymers used in other PCL devices, which may make it more stable during the melting process which occurs every time a device trips. The molecular weight of the polymer molecules may also be higher, making the polymer more stable.

In accordance with the invention, the PCL devices have higher trip and hold currents for a given device geometry and composite resistivity, than any other current limiting devices. This is a direct consequence of their having a higher melting point polymer since it takes more energy to get them to trip. This is commercially important because it allows the use of smaller devices in place of larger devices with no sacrifice in the magnitude of the trip and hold currents. This is potentially very useful in reducing the size of electronics. Raychem has been introducing progressively smaller sized current limiting devices over the past few years in particular for surface mount devices. When the current limiting devices are used in a surface mount configuration, their size takes up valuable real estate (the "footprint") on a circuit board. Raychem has so far attacked this problem by decreasing the resistivity of their standard polyethylene/carbon-black composite wherein decreasing the composite resistivity has the effect of increasing the trip and hold currents. However, there is little room for further decreases in composite resistivity using carbon black and polymers. The composite resistivity of the prototype PCL device in accordance with the invention is about 4 Ohm-cm while the Raychem devices have resistivities as low as 0.4 Ohm-cm. In principle, the resistivity of the PCL devices in accordance with the invention could be decreased to similar levels, which could give smaller devices with the same trip and hold currents as larger Raychem devices.

DETAILED DESCRIPTION OF A PREFERRED EMBODIMENT

The invention is particularly applicable to a perfluoroalkoxy (PFA) polymer current limiting device and it is in this context that the invention will be described. It will be appreciated, however, that the device and method in accordance with the invention has greater utility.

Figure 1A:
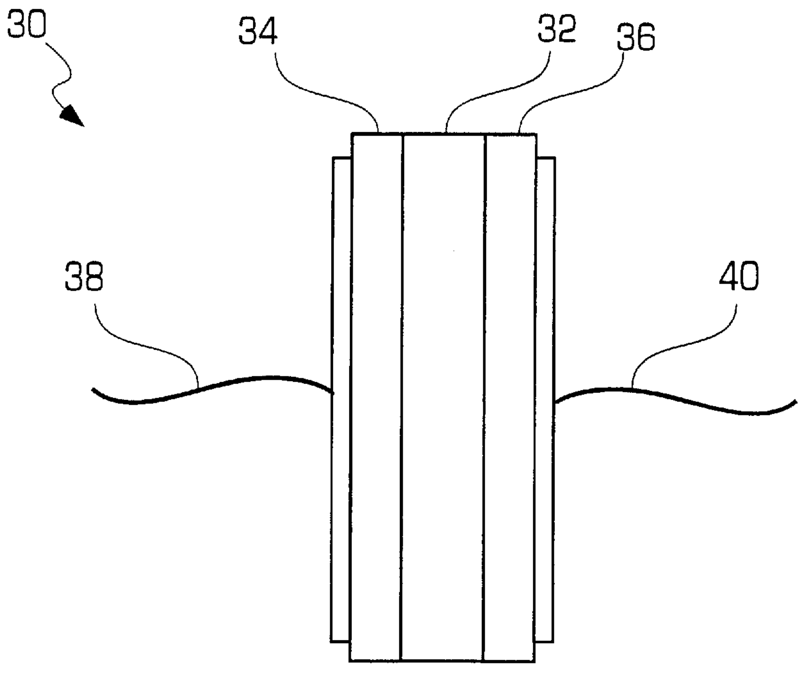
FIGS. 1A and 1B are diagrams illustrating the PCL device in accordance with the invention.
Figure 1B:
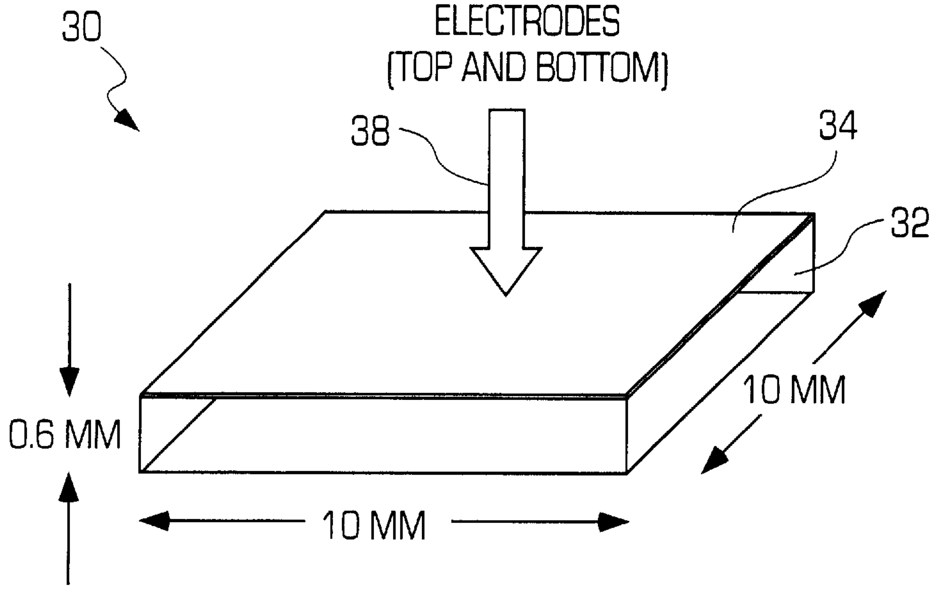

FIGS. 1A and 1B are diagrams illustrating a polymer current limiting (PCL) device 30 in accordance with the invention. The device 30 may comprise a composite mixture 32 that is sandwiched by a first and second electrode 34, 36. In a preferred embodiment, the composite mixture may have a predetermined mixture of carbon black and a PFA fluoropolymer. The PFA fluoropolymer helps the device operate at higher temperatures and have a lower thermal derating than conventional devices as described below. In a preferred embodiment, the electrodes may be a thin metal foil. To make an electrical connection to the device, there may be a first and second wire 38, 40 attached to the thin metal coatings by solder. In a preferred embodiment, the solder used to attach the wires to the metal foil may be pure lead (Pb) which permits the device to operate at higher temperatures as described below in more detail. FIG. 1B shows the dimensions of an example of the device in accordance with the invention.

In addition to the embodiment in which the electrodes are attached to the PCL as described above, the composite mixture may be formed as described above. Then, the composite mixture is formed into a predetermined shape. Then, it may be inserted directly into a pair of contacts and perform the functions of a PCL as described below. For example, the formed composite mixture may be inserted into a pair of spring loaded contacts that make electrical contact with each side of the formed composite mixture. Furthermore, a metal foil may be attached to one or both sides of the formed composite material and then the formed composite material with the foil may be inserted into a pair of contacts. The metal foil will act as a contact to the formed composite material.

In operation, the device operates in a similar manner to conventional current limiting devices. In particular, during normal operation, current flows through the composite mixture with minimal resistance. As the current passing through the device increases to some overcurrent level, the heat generated by the current melts the composite material. When the composite material melts, the resistance of the composite material and hence the device increases so that the resistance increases and effectively limits the current passing through the device. After the current through the device reduces to an acceptable level, the composite material re-solidifies and the resistance of the device returns to a lower level. Thus, the PCL device is resettable as with conventional current limiters. Now, a preferred method for manufacturing the PCL device in accordance with the invention will be described.

Figure 2:
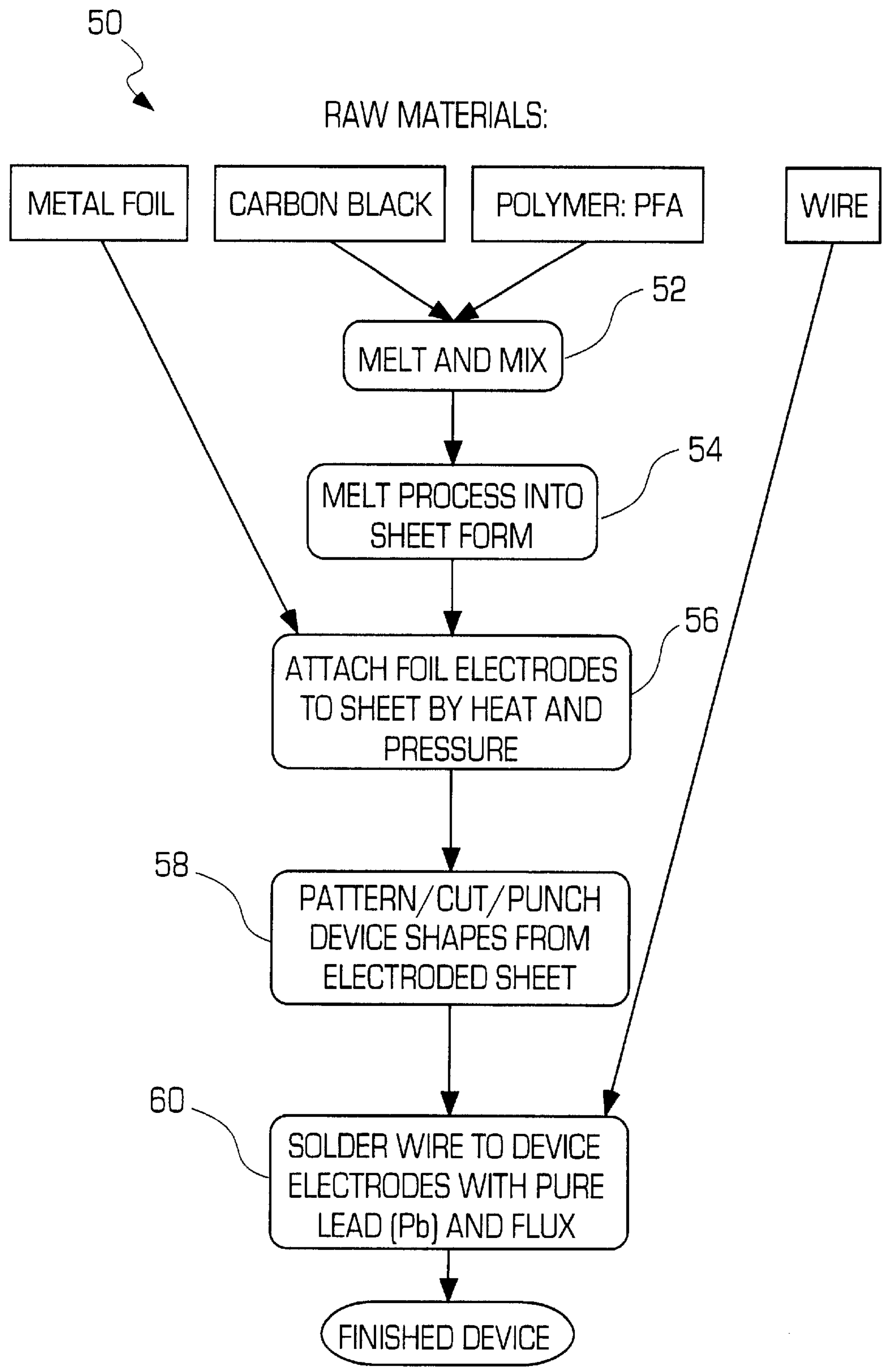
FIG. 2 illustrates a method for manufacturing a PCL device in accordance with the invention.

FIG. 2 illustrates a method 50 for manufacturing a PCL device in accordance with the invention. In particular, one or more raw materials may be used that may include metal foil, carbon black, perfluoroalkoxy (PFA) polymer and attachment wire. In accordance with a preferred embodiment of the invention, the carbon black may be Raven 420 carbon black from Columbian Chemicals, the polymer may be teflon PFA 340 obtained from Du Pont Company and the electrodes may be special nodularized foil sheets (product ND21P) obtained from Gould Electronics Inc. having electro-deposited copper foil with copper nodularization and nickel over plates. The attachment wires may preferably be 18 gauge bus wire (solder coated copper wire) obtained from a surplus electronics store, the lead solder may preferably be solid lead ingots obtained from Alan Steel and the flux may preferably be Kester 1588 rosin soldering flux obtained from Kester Solder.

In step 52, the composite mixture is made by melting and mixing the carbon black and the PFA together. In a preferred embodiment, the mixture uses the Raven 420 carbon black and the Du Pont Teflon PFA 340 polymer. In one actual experiment, the compounding was done to form a composite using a 33 mm twin-screw extruder, with a carbon black loading of 35 weight %. The percentage of carbon black may vary between 25 and 50 weight % and may optimally be about 40 weight %. The carbon black may also be supplemented with or replaced by powdered metal particles, such a nickel particles.

The composite is in the form of pellets. In steps 54 and 56, the composite is melted and pressed into plates and foil electrodes are attached to the sheet. In particular, the platens of a laboratory press are preheated to 343° C. and the composite pellets are put into a sheet mold and put into the press. The pellets are put under slight ("kiss") pressure to allow good thermal contact. Then, one waits about 10 minutes for the mold and the composite to heat up. Once everything is heated up, 40,000 lbs. pressure to 9" by 9" platens are applied. Next, one waits for 10 minutes for the composite to flow into sheet form under high pressure and high temperature. At end of 10 minutes, the heat is turned off and the mold and composite cool down still under high pressure to form the composite material with foil electrodes attached.

In step 58, the sheet is cut into individual devices wherein a pair of tin snips may be used to cut the sheet into 1 cm by 1 cm squares. Then, the individual devices may be re-flattened using a room temperature press at 1000 lbs. for a few minutes. At this point, the devices are 0.053 cm thick. In step 60, the attachment wires are attached to each side of the device. In particular, pure lead (Pb) solder is heated to 350° C. in a solder pot. Then, attachment wires are made from 18 gauge solder coated copper wire. Next, the device chips are placed between ends of the attachment wires and dipped in Kester 1855 soldering flux for 5 seconds. The device is then held over the surface of molten lead (Pb) pot for 30 seconds to allow the flux to activate. The device is then dipped fully into the molten lead (Pb) for 5 seconds and pulled out to let it cool down. Once the devices have cooled down, the attachment wires may be clipped and bent to the desired shape. The advantages of the polymer current limiting device in accordance with the invention are described above. Now, the various characteristics of the PCL device in accordance with the invention will be described in more detail.

Figure 3:
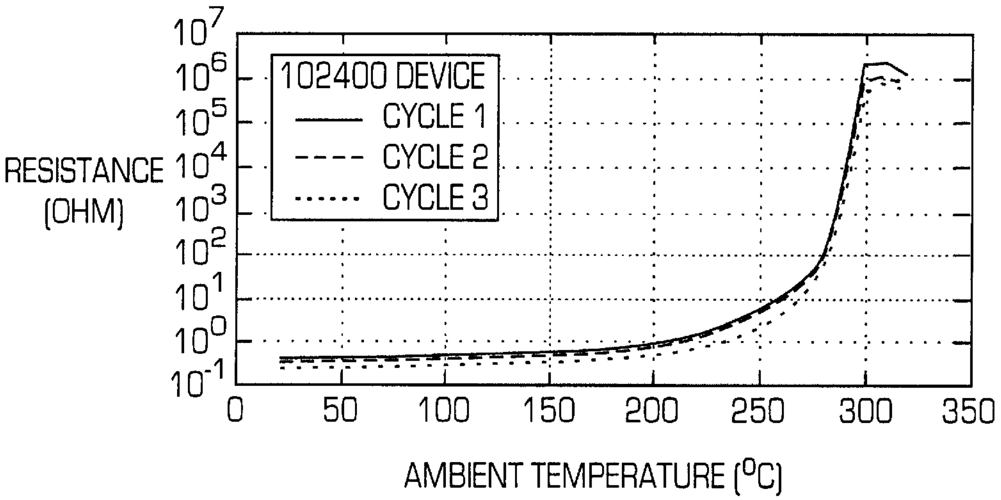
FIG. 3 illustrates the resistance versus temperature behavior of one representative PCL device in accordance with the invention.

FIG. 3 illustrates the resistance versus temperature behavior of the PCL device in accordance with the invention. In particular, the measured resistance versus temperature behavior for three temperature cycles for a PCL device in accordance with the invention made as described above. Note that the device resistance at 20° C. drops 38% between the first and second cycles, then drops only 3.7% between the second and third cycle. This suggests that the devices have stability during further temperature cycling. The resistance of the device at 20° C. at the start of the third cycle is 0.26 ohm. Using the preferred device dimensions given above, the composite resistivity at this point is 5 Ohm-cm. Now, the current versus voltage behavior of the PCL device will be described.

Figure 4:
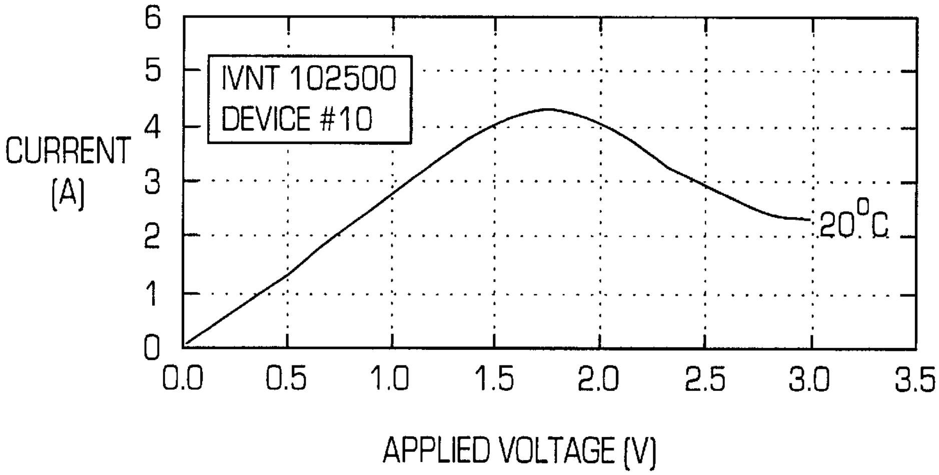
FIG. 4 illustrates the current versus voltage behavior of one representative PCL device in accordance with the invention.

FIG. 4 illustrates the current versus voltage behavior of the PCL device in accordance with the invention. To test this behavior, a fixed voltage is applied across the device and the device is allowed to reach equilibrium. Then, the steady state current passing through the device is measured. The figure shows the measured current versus voltage behavior for the same device at 20° C. Note that, as the voltage is increased, the current initially increases in direct proportion to the applied voltage so that the device acts like a resistor. However, once a certain critical current is reached, the current stops increasing and starts decreasing as applied voltage is still increased as shown. For the particular device tested, the maximum current the device will allow to pass under equilibrium conditions is 4.3 amps. This is defined as the "hold current" of this device. This figure illustrates the basic behavior that makes these devices work as current limiters in electric circuits. In particular, placing this device in series with a circuit load will protect the load from fault currents in excess of 4.3 amps that could potentially cause damage. Now, the current versus voltage behavior of the PCL device as a function of temperature will be described.

Figure 5:
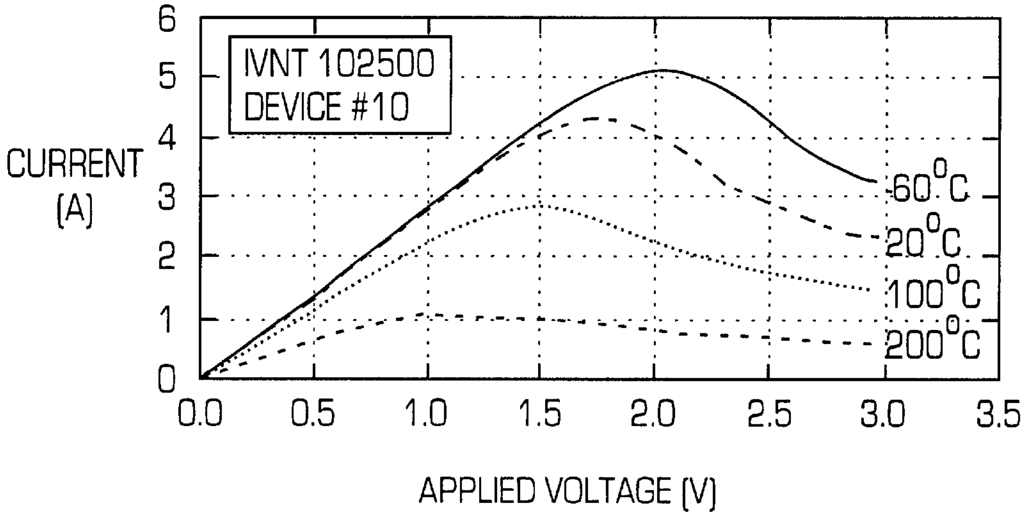
FIG. 5 illustrates the current versus voltage behavior as a function of temperature of one representative PCL device in accordance with the invention.
Figure 6:
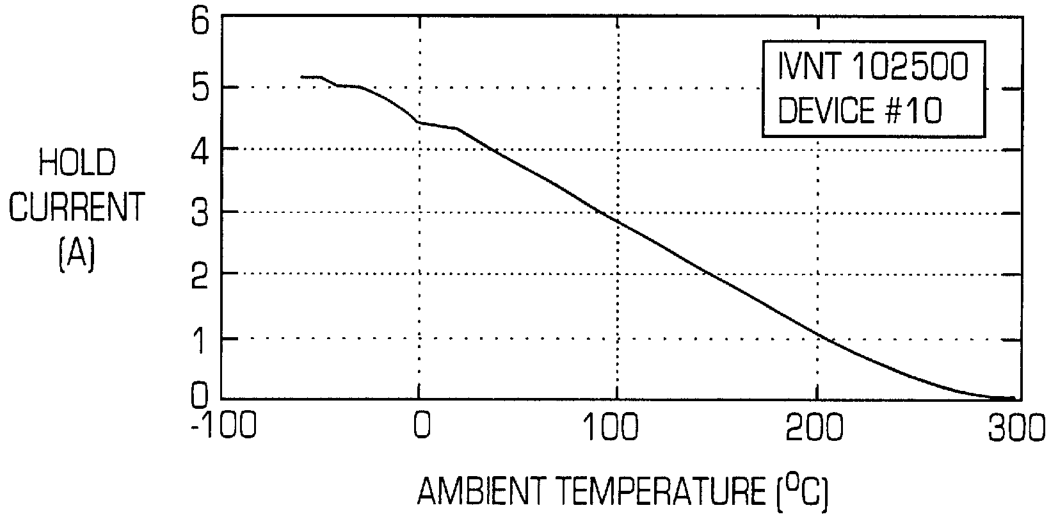
FIG. 6 illustrates the hold current as a function of ambient temperature of one representative PCL device in accordance with the invention.
Figure 7:
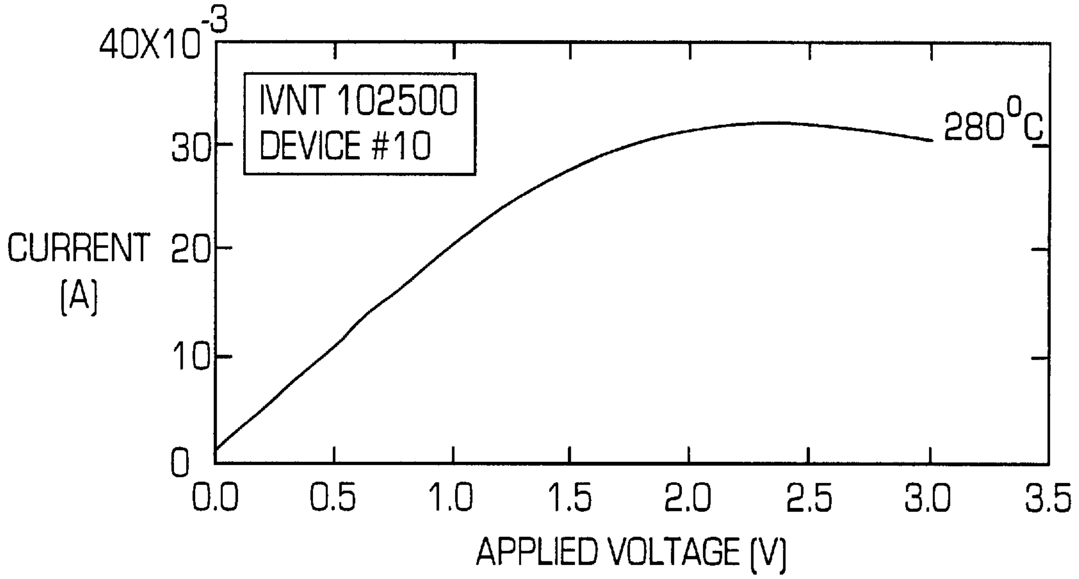
FIG. 7 illustrates the current versus voltage behavior of one representative PCL device in accordance with the invention at an ambient temperature of 280 degrees C.

FIG. 5 illustrates the current versus voltage behavior as a function of ambient temperature of the PCL device in accordance with the invention. This test may be done by repeating the test described above in a controlled temperature chamber at different temperatures. The figure shows representative data for the same device at four different ambient temperatures. From this figure, it is evident that the "hold current" of the device decreases as the ambient temperature increases. This behavior is known as "thermal derating" and is important in the application of these devices. For example, consider a device designed in the laboratory to limit the current in a circuit at room temperature to a maximum of 5 amps. When this same device and circuit are placed near the engine of a car, where ambient temperatures can be significantly higher than room temperature, the device will limit the current in the circuit to a value significantly less than 5 amps which may cause the circuit to malfunction. A plot of the decrease of hold current as a function of ambient temperature is known as the "thermal derating curve." The thermal derating curve for the device measured in FIG. 5 is shown in FIG. 6. Note that the device functions as a current limiter between −60° C. and 280° C. The current versus voltage behavior of the device at 280° C. is shown in FIG. 7. In particular, the hold current of this device has decreased from 4.3 amps at 20° C. to 32 milliamps at 280° C., but the device will still act to limit currents.

As a quantitative example, most Raychem current limiting devices (those with an operating temperature range of −40° C. to 85° C.) have a thermal derating of −1%/° C., meaning that the trip current decreases by an average of 1% for every 1° C. increase in the ambient temperature. The PCL devices in accordance with the invention have an experimentally measured thermal derating of −0.4%/°C. over the same operating temperature range meaning that the trip current decreases by an average of 0.4% for every 1° C. increase in the ambient temperature. This is commercially useful because it makes the PCL devices more tolerant to changes in ambient temperature and fluctuations in the thermal environment. In accordance with the invention, the PCL devices may have a thermal derating of less than −1%/°C., preferably a thermal derating of less than −0.5%/°C. and most preferably a thermal derating of about −0.4%/° C. Now, the overload characteristics for the PCL device in accordance with the invention will be described.

Figure 8:
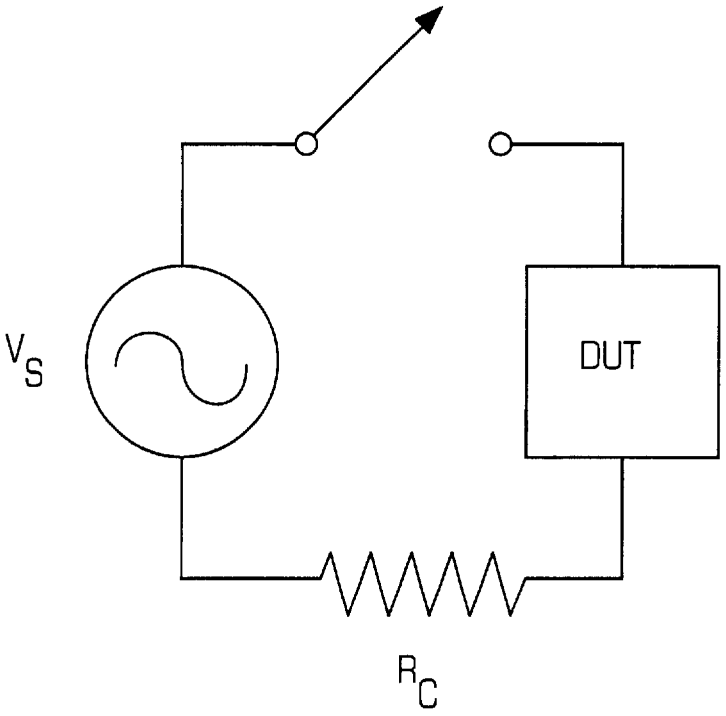
FIG. 8 illustrates a circuit used for testing the PCL device in accordance with the invention.

FIG. 8 illustrates a circuit used for testing the overload state of the PCL device in accordance with the invention. This test is specified in the Underwriter Laboratories UL 1434 Standard for Safety for Thermistor-Type Devices, First Edition, Apr. 3, 1998. To conduct the test, the circuit in FIG. 8 is constructed where $V_s$ is an ac voltage source, $R_c$ is the circuit resistance, DUT is the PCL device under test and the switch at the top of the circuit is a remotely controlled relay. First, the DUT is replaced by an open circuit, the relay is closed and the voltage source $V_s$ is adjusted such that the voltage across the open circuit is 16 Volts rms at 60 Hz. Next, the DUT is replaced by a short circuit, the relay is closed and the circuit resistance $R_c$ is adjusted such that the current through the short circuit is 125 Amps rms at 60 Hz. Next, the DUT is replaced by a polymer current limiter (PCL) device in accordance with the invention. Next, the relay is closed for ten seconds and then opened for 50 seconds. This step is repeated for 50 cycles.

The sample PCL device in accordance with the invention was then tested. Before the overload test, the device resistance was 0.276 ohms. After the overload test, the device resistance was 0.533 ohms. Thus, the device appears to pass the overload test. Now, the characteristics of the PCL device in accordance with the invention under the endurance test are described.

The endurance test is specified in the Underwriter Laboratories UL 1434 Standard for Safety for Thermistor-Type Devices, First Edition, Apr. 3, 1998. To conduct the test, the same circuit for the overload test is used. First, the DUT is replaced by an open circuit, the relay is closed and the voltage source $V_s$ is adjusted such that the voltage across the open circuit is 16 Volts rms at 60 Hz. Next, the DUT is replaced by a short circuit, the relay is closed and the circuit resistance $R_c$ is adjusted such that the current through the short circuit is 3 times the device trip current at 60 Hz. Now, the DUT is replaced by the polymer current limiter (PCL) device to be tested. To test the device, the relay is closed for 10 seconds and then opened for 50 seconds. The above step is repeated for a total of 6000 cycles.

When a sample of the PCL device is tested, it has a trip current of about 4.3 Amps dc. The circuit resistance $R_c$ was increased such that 14 Amps rms at 60 Hz flowed in the circuit when the DUT was replaced by a short circuit and the relay was closed. The device failed somewhere between 4540 and 5140 cycles. The failure may have been caused by improper laboratory test conditions.

Figure 9:
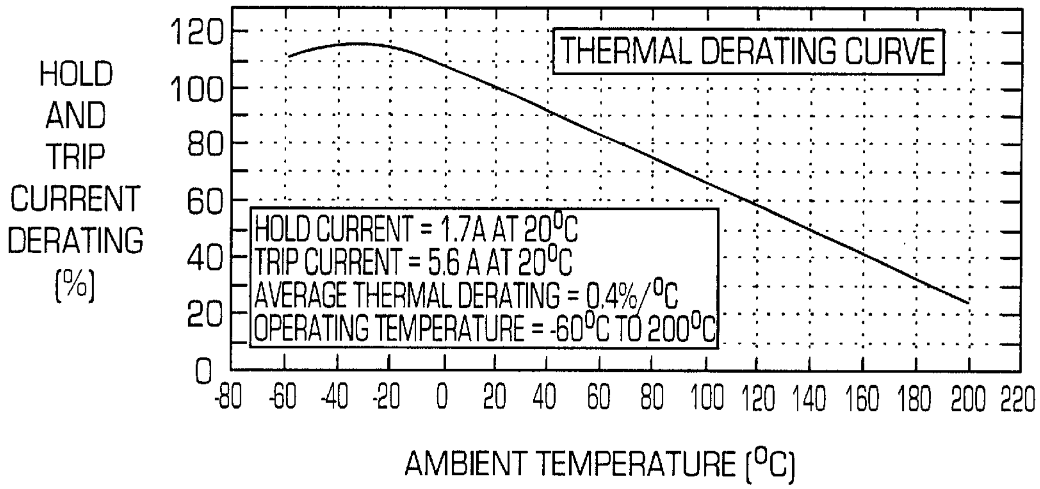
FIG. 9 illustrates the average hold and trip current derating versus ambient temperature behavior of an ensemble of 16 PCL devices in accordance with the invention.
Figure 10:
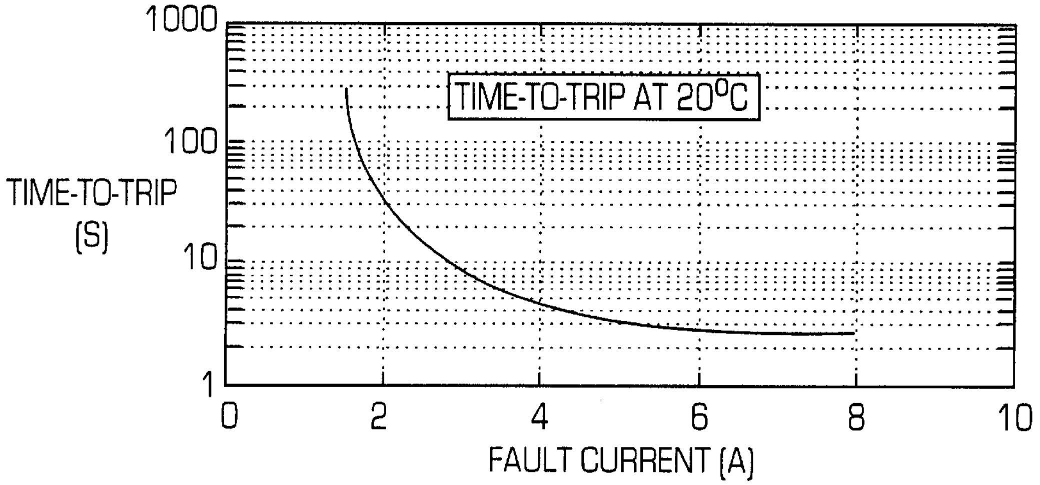
FIG. 10 illustrates a time to trip versus fault current behavior of the PCL device in accordance with the invention at an ambient temperature of 20 degrees C.

FIGS. 9 and 10 illustrate the hold and trip current derating versus ambient temperature behavior of the PCL device in accordance with the invention and the time to trip versus fault current behavior of the PCL device in accordance with the invention at 20 degrees C.

While the foregoing has been with reference to a particular embodiment of the invention, it will be appreciated by those skilled in the art that changes in this embodiment may be made without departing from the principles and spirit of the invention.

What is claimed is:

1. A current limiting device operable having a wide operating temperature range, the device comprising:

a predetermined mixture of carbon black and a fluoropolymer pressed between a first electrode and a second electrode;

an electrical connection formed by fixing attachment wires to the first and second electrodes; and wherein the fluoropolymer melts at a predetermined high temperature so that the current limiting device operates within a wide temperature range.

2. The current limiting device of claim 1, wherein the polymer is a non-flammable, self-extinguishing fluoropolymer.

3. The current limiting device of claim 2, wherein the fluoropolymer is a perfluoroalkoxy polymer.

4. The current limiting device of claim 1, wherein the first and second electrodes are composed of thin metal foil.

5. The current limiting device of claim 1 further comprising solder used to fix the first and second electrodes to the attachment wires, the solder being able to withstand ambient temperatures above 300 degrees Celsius.

6. The current limiting device of claim 5, wherein the solder is pure lead.

7. The current limiting device of claim 1 further comprising a thermal derating of less than −1%/degree Celsius.

8. The current limiting device of claim 7, wherein the thermal derating is less than −0.5%/degree Celsius.

9. The current limiting device of claim 8, wherein the thermal derating is about −0.4%/degree Celsius.

10. The current limiting device of claim 1, further comprising a composite resistivity of at most 5 Ohm-cm.

11. The device of claim 1, wherein the operating temperature range is from at least −60 degrees Celsius to 280 degrees Celsius.

12. A method for manufacturing a current limiting device operable at a temperature range of at least −60 degrees Celsius to 280 degrees Celsius, the method comprising:

providing a predetermined amount of carbon black;

melting said predetermined amount of carbon black with a predetermined amount of fluoropolymer;

pressing the resulting mixture to form a sheet of current limiting material;

attaching electrodes to the sheet; and fixing conductive attachment wires to each side of the device, the fixing further comprising dipping the device into a soldering flux for a predetermined number of minutes and dipping the device into pure lead solder for a predetermined time to form a wide temperature range current limiting device.

13. The method of claim 12, wherein the polymer is a non-flammable, self-extinguishing fluoropolymer.

14. The method of claim 13, wherein the fluoropolymer is a perfluoroalkoxy polymer.

15. The method of claim 12, wherein the electrodes are composed of thin metal foil.

16. The method of claim 12 further comprising a thermal derating of less than −1%/degree Celsius.

17. The method of claim 16, wherein the thermal derating is less than −0.5%/degree Celsius.

18. The method of claim 17, wherein the device has a thermal derating of about −0.4%/degree Celsius.

19. The method of claim 12, wherein the device has a composite resistivity of at most 5 Ohm-cm.

20. A current limiting device operable at a temperature range of at least −60 degrees Celsius to 280 degrees Celsius comprising:

a predetermined composite mixture of carbon black and a fluoropolymer;

first and second electrodes between which the composite mixture is pressed; and an electrical connection connected to the first and second electrodes, the electrical connection being made using pure lead solder such that the solder has a high melting temperature resulting in a current limiting having a wide temperature range.

21. A current limiting device operable at a temperature range of at least −60 degrees Celsius to 280 degrees Celsius, the device comprising:

a predetermined composite mixture of carbon black and a non-flammable, self-extinguishing fluoropolymer;

first and second electrodes having the composite mixture pressed therebetween; and an electrical connection connected to the first and second electrodes, the electrical connection being made using pure lead solder such that the solder has a high melting temperature resulting in a current limiting device having a wide temperature range.

22. A current limiting device operable at a temperature range of at least −60 degrees Celsius to 280 degrees Celsius, the device comprising:

a predetermined composite mixture of carbon black and a polymer pressed between a first electrode and second electrode; and an electrical connection formed by fixing a first attachment wire to the first electrode and a second attachment wire to the second electrode using pure lead solder, and wherein the device has a thermal derating of at least −0.4 percent/degrees Celsius.

23. A current limiting device comprising;

a predetermined composite mixture of carbon black and a polymer pressed between a first electrode and second electrode;

an electrical connection formed by fixing a first attachment wire to the first electrode and a second attachment wire to the second electrode using solder; and wherein the device is operable at a temperature range of at least −60 degrees Celsius to 280 degrees Celsius and have a thermal derating of about −0.4 percent/degrees Celsius.

24. The current limiting device of claim 23 wherein the polymer is a non-flammable, self-extinguishing fluoropolymer.

25. The current limiting device of claim 24, wherein the fluoropolymer is a perfluoroalkoxy polymer.

26. The current limiting device of claim 23, wherein the electrodes are composed of thin metal foil.

27. The current limiting device of claim 23, wherein the solder used to join the electrodes to the attachment wires can withstand ambient temperatures above 300 degrees Celsius.

28. The current limiting device of claim 27, wherein the solder is pure lead.

29. The current limiting device of claim 23 further comprising a composite resistivity of at most 5 Ohm-cm.

30. A current limiting device comprising:

a predetermined amount of carbon black;

a predetermined amount of perfluoroalkoxy polymer mixed with the carbon black;

first and second electrodes in between which the mixture of carbon black and polymer is pressed;

first and second attachment wires connected to the first and second electrodes using pure lead solder so that the current limited device has a wide temperature operating range.

31. A current limiting device operable having a wide operating temperature range, the device comprising:

a predetermined mixture of carbon black and a fluoropolymer pressed into a predetermined form;

wherein an electrical connection to the predetermined form is formed when contacts are pressed against each side of the predetermined form when the predetermined form is inserted into an electrical circuit; and wherein the fluoropolymer melts at a predetermined high temperature so that the current limiting device operates within a wide temperature range.

32. The current limiting device of claim 31, wherein the polymer is a non-flammable, self-extinguishing fluoropolymer.

33. The current limiting device of claim 32, wherein the fluoropolymer is a perfluoroalkoxy polymer.

34. The current limiting device of claim 31 further comprising a thermal derating of less than −1%/degree Celsius.

35. The current limiting device of claim 34, wherein the thermal derating is less than −0.5%/degree Celsius.

36. The current limiting device of claim 35, further comprising a thermal derating of about −0.4%/degree Celsius.

* * * * *